| (12) | United States Patent | (10) Patent No.: | US 9,033,680 B2 |
|---|---|---|---|
| | Kudo et al. | (45) Date of Patent: | May 19, 2015 |

(54) ELECTRIC FAN

(71) Applicant: SANYO DENKI CO., LTD., Tokyo (JP)

(72) Inventors: Naruhiko Kudo, Nagano (JP); Tomoaki Ikeda, Nagano (JP); Haruhisa Maruyama, Nagano (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days.

(21) Appl. No.: 14/221,697

(22) Filed: Mar. 21, 2014

(65) Prior Publication Data

US 2014/0205476 A1     Jul. 24, 2014

Related U.S. Application Data

(62) Division of application No. 13/021,128, filed on Feb. 4, 2011, now abandoned.

(30) Foreign Application Priority Data

Feb. 8, 2010    (JP) ................. 2010-025860

(51) Int. Cl.
     *F04D 25/06*        (2006.01)
     *F04D 17/16*        (2006.01)
     *F04D 29/059*      (2006.01)
     *F04D 29/08*        (2006.01)
     *H02K 5/10*         (2006.01)

(52) U.S. Cl.
     CPC ............ *F04D 25/0646* (2013.01); *F04D 17/16* (2013.01); *F04D 25/0613* (2013.01); *F04D 29/059* (2013.01); *F04D 29/083* (2013.01); *H02K 5/10* (2013.01)

(58) Field of Classification Search
     CPC ... F04D 17/16; F04D 25/0613; F04D 29/059; F04D 29/083; H02K 5/10
     USPC ................. 417/354, 423.1, 423.11, 423.14
     See application file for complete search history.

(56) References Cited

U.S. PATENT DOCUMENTS

| 6,551,074 | B2 | 4/2003 | Kuda et al. | |
|---|---|---|---|---|
| 2002/0025261 | A1* | 2/2002 | Kudo et al. | 417/354 |
| 2004/0145250 | A1* | 7/2004 | Kudo et al. | 310/43 |
| 2006/0012256 | A1* | 1/2006 | Takeuchi et al. | 310/88 |
| 2006/0181247 | A1* | 8/2006 | Marukawa et al. | 320/150 |
| 2007/0177996 | A1* | 8/2007 | Chapman et al. | 417/370 |

FOREIGN PATENT DOCUMENTS

| EP | 575763 A1 * | 12/1993 | ............ F04D 29/28 |
|---|---|---|---|
| JP | 55-112100 | 8/1980 | |

(Continued)

*Primary Examiner* — Peter J Bertheaud
*Assistant Examiner* — Dominick L Plakkoottam
(74) *Attorney, Agent, or Firm* — Rankin, Hill & Clark LLP

(57) ABSTRACT

An electric fan is provided, including a labyrinth structure with increased performance of preventing entry of a liquid into a receiving space to receive a stator and a rotor. A clearance is defined between an opposed wall portion of a base and an opposed wall portion of an impeller body, which are opposed to each other in an axial direction of a rotary shaft, to form a labyrinth structure. The opposed wall portion of the base and the opposed wall portions of the impeller body are shaped to form a volume expanding portion within the clearance. The volume expanding portion is constituted from a groove portion for expanding the clearance, having a volume larger than other portions within the clearance.

1 Claim, 8 Drawing Sheets

(56) References Cited

FOREIGN PATENT DOCUMENTS

| | | |
|---|---|---|
| JP | 2000-014072 | 1/2000 |
| JP | 2002-061596 | 2/2002 |
| JP | 3694224 | 9/2005 |
| JP | 2009-525434 | 7/2009 |
| JP | 2011-047387 | 3/2011 |
| WO | 2007/089964 | 8/2007 |

* cited by examiner

ELECTRIC FAN

TECHNICAL FIELD

The present invention relates to an electric fan such as an axial fan and a centrifugal fan, which uses an electric motor as a driving source.

BACKGROUND ART

An electric fan which comprises an impeller and a casing is known. The impeller includes a plurality of blades and is configured to rotate by an electric motor. The casing includes a base which defines a receiving space to receive a stator and a rotor of the electric motor. In such an electric fan, a liquid such as water may enter into the receiving space from between an impeller body of the impeller and the base. In order to cope with this problem, Japanese Patent No. 3694224 (JP3694224), for example, proposes that a clearance be defined between a casing and an impeller of a centrifugal fan to form a labyrinth structure for blocking entry of a liquid into a receiving space.

SUMMARY OF THE INVENTION

There is a limit to enhancing waterproof performance of a conventional structure for preventing entry of the liquid into the receiving space even if a clearance is provided to form a labyrinth structure as mentioned above.

Further, when the clearance forming the labyrinth structure is defined, dimensional tolerances of the casing and the impeller are reduced. Thus, assembly accuracy of the impeller body and the casing of the electric fan needs to be increased.

An object of the present invention is to provide an electric fan in which waterproof performance may be enhanced by using a labyrinth structure which prevents a liquid from entering into a receiving space to receive a stator and a rotor, as compared with conventional electric fans.

Another object of the present invention is to provide an electric fan including a labyrinth structure by which waterproof performance may not be reduced so significantly as in conventional electric fans even if assembly accuracy of the electric fan is lower than that in conventional electric fans.

An electric fan such as an axial fan or a centrifugal fan, improvement of which is aimed at by the present invention, comprises an electric motor, an impeller, a casing, and one or more bearings. The electric motor comprises a rotary shaft, a stator including stator magnetic poles, and a rotor including rotor magnetic poles and configured to rotate outside the stator, centering on the rotary shaft. The impeller is disposed outside the rotor, and includes an impeller body fixed to the rotor and including an opposed wall portion, and a plurality of blades fixed to the impeller body. The casing includes a bearing holder by which the one or more bearings for supporting the rotary shaft are held, and a base including an opposed wall portion opposed to the opposed wall portion of the impeller body in an axial direction of the rotary shaft and extending in a radial direction of the rotary shaft and combined with the impeller body to define a receiving space to receive the stator and the rotor. Then, a clearance is defined between the opposed wall portion of the base and the opposed wall portion of the impeller body to form a labyrinth structure for blocking entry of a liquid into the receiving space from radially outside of the rotary shaft. In the present invention, the opposed wall portion of the base and the opposed wall portion of the impeller body are shaped to form one or more volume expanding portions each having a volume larger than other portions within the clearance.

In a specific electric fan which is configured by applying the present invention to a centrifugal fan, the impeller body of the impeller includes a fixed portion fixed to the rotor, and a blade support fixed to the fixed portion and extending in the radial direction of the rotary shaft. Then, the blades are fixed to the blade support of the impeller body to suck an air from a side on which one axial end of the rotary shaft of the electric motor is located and discharge the air in the radial direction of the rotary shaft. The casing includes the bearing holder by which the one or more bearings for supporting the rotary shaft are held, and the base extending in the radial direction of the rotary shaft and combined with the fixed portion to define the receiving space to receive the stator and the rotor.

Since the one or more volume expanding portions are formed within the clearance which forms the labyrinth structure in the present invention, the liquid which has entered into the clearance pools in the one or more volume expanding portions. Then, after the one or more volume expanding portions have been filled with the liquid, the liquid goes further toward the receiving space. As a result, a period of time until the liquid enters into the receiving space is longer than that in the conventional structure, thereby enhancing the waterproof performance according to the present invention. Further, by providing the one or more volume expanding portions, the volume of the entire labyrinth structure may be increased more than the conventional structure, thereby enhancing the waterproof performance. Accordingly, dimensional tolerances of the casing and the impeller do not need to be reduced so much as in conventional structures in order to enhance the waterproof performance. Even if assembly accuracy of the electric fan is lower than those of conventional structures, the waterproof performance is not significantly reduced.

The volume expanding portion may be formed in a variety of configurations. If the thickness of the opposed wall portion of the impeller body as measured in the axial direction is large, for example, a groove portion for expanding the clearance may be formed in the opposed wall portion of the impeller body. The groove portion extends in a direction apart from the base to define a main part of the volume expanding portion. Alternatively, when the thickness of the opposed wall portion of the base as measured in the axial direction is large, a groove portion for expanding the clearance may be formed in the opposed wall portion of the base. The groove portion extends in a direction apart from the impeller body to define a main part of the volume expanding portion. Thus, the volume expanding portion may appropriately be formed according to the specification of an electric fan.

Alternatively, a groove portion for expanding the clearance may be formed in the opposed wall portion of the impeller body, and a groove portion for expanding the clearance may be formed in the opposed wall portion of the base as well. The groove portion in the opposed wall portion of the impeller body extends in a direction apart from the base to define a part of the volume expanding portion. The groove portion in the opposed wall portion of the base extends in a direction apart from the impeller body to define the remaining part of the volume expanding portion. In this configuration, even if the thicknesses of the opposed wall portion of the impeller body and the opposed wall portion of the base as measured in the axial direction are small, the volume expanding portion of a certain size may be formed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF PREFERRED EMBODIMENTS

Figure 1:
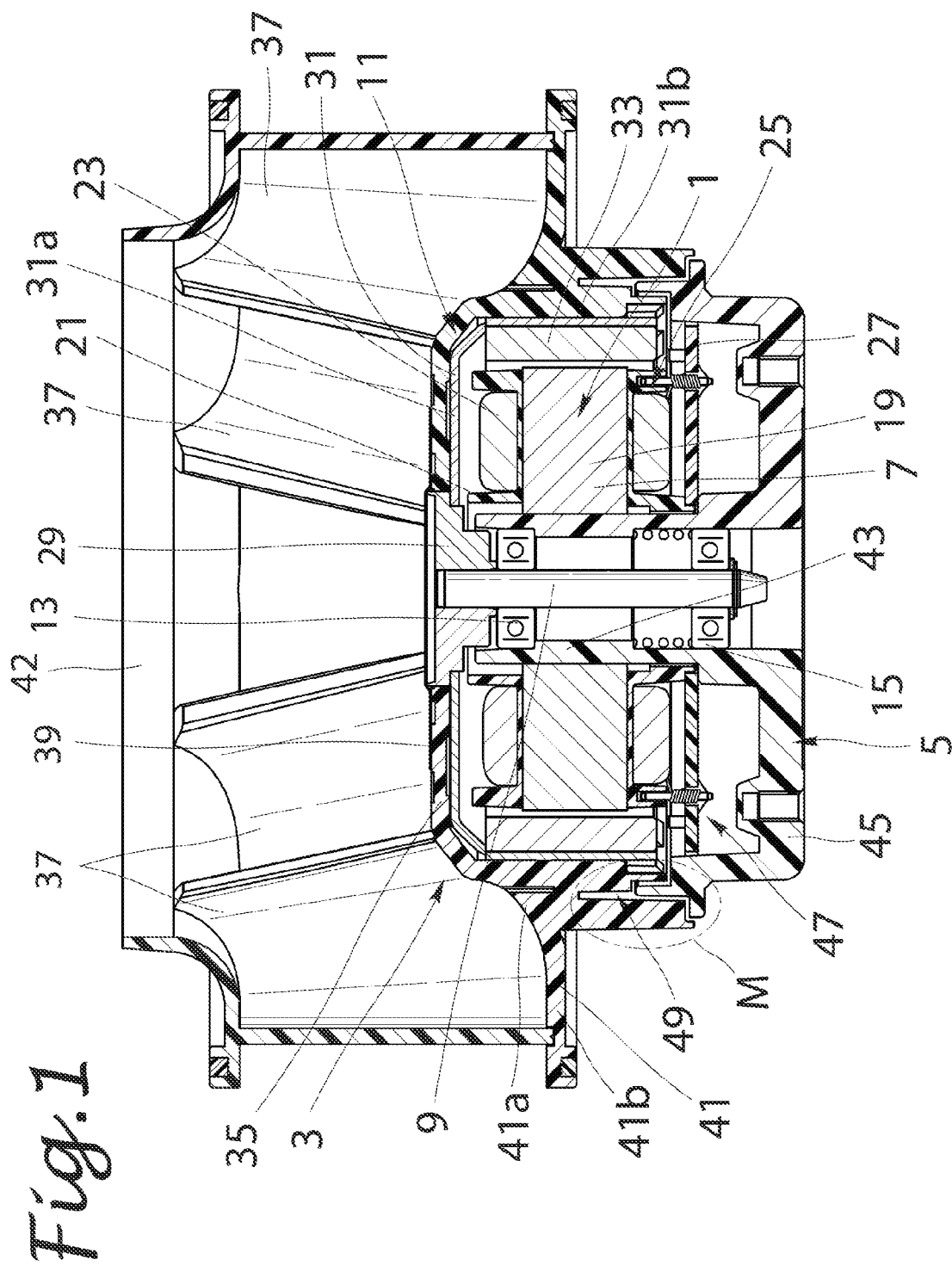
FIG. 1 is a sectional view of an electric fan in a first embodiment of the present invention applied to a centrifugal fan.
Figure 2:
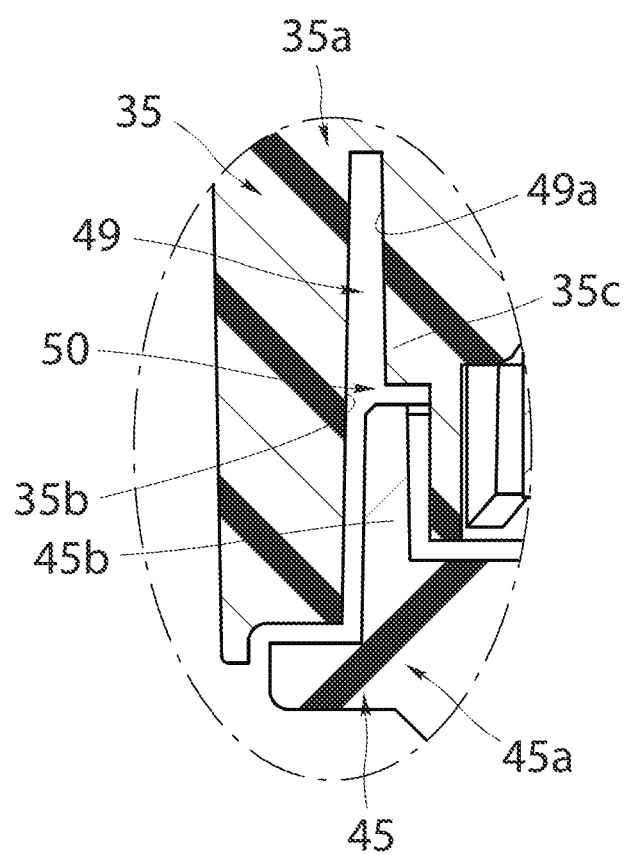
FIG. 2 is a partially enlarged view of a portion indicated by reference sign M in FIG. 1.

Embodiments of the present invention will be described below in detail with reference to the drawings. FIG. 1 is a sectional view of an electric fan in a first embodiment of the present invention applied to a centrifugal fan. FIG. 2 is a partially enlarged view of a portion indicated by reference sign M in FIG. 1. The electric fan of this embodiment comprises an electric motor 1, an impeller 3 made of a synthetic resin and configured to be rotated by the electric motor 1, and a casing 5 for partially receiving components of the electric motor 1. The electric motor 1 includes a stator 7 and a rotor 11 configured to rotate outside the stator 7, centering on a rotary shaft 9. The stator 7 is mounted on a bearing holder 43 in which two ball bearings 13 and 15 for rotatably supporting the rotary shaft 9 are fitted and held. The stator 7 comprises a stator core 19 disposed outside this bearing holder 43, an insulator 21 made of an insulating resin and fitted with the stator core 19, and stator windings 23 wound around a plurality of pole portions of the stator core 19 through the insulator 21. The stator windings 23 are each electrically connected to a circuit pattern of a circuit board 27, not shown, through a connecting conductor 25. A drive circuit is mounted on the circuit board 27 for feeding an excitation current through the stator windings 23.

The rotor 11 comprises a cylindrical boss 29 made of an insulating material and fixed to the rotary shaft 9, a cup-like member 31 made of a magnetic conductive material and fixed to the rotary shaft 9 through the boss 29, and rotor magnetic poles 33 formed of a plurality of permanent magnets and fixed to the cup-like member 31. The cup-like member 31 includes a bottom wall portion 31a having in a central portion thereof a through hole through which the boss 29 passes and a cylindrical peripheral wall portion 31b extending from an outer edge of the bottom wall portion 31a in an axial direction of the rotary shaft 9. The permanent magnets constituting the rotor magnetic poles 33 are bonded to an inner peripheral surface of the peripheral wall portion 31b of the cup-like member 31 to face a magnetic pole surface of the stator core 19 constituting stator magnetic poles of the stator 7.

The impeller 3 includes an impeller body 35 and a plurality of blades 37. The impeller body 35 and the blades 37 are unitarily formed of a synthetic resin. The impeller body 35 includes a fixed portion 39 fixed to an outside of the cup-like member 31 of the rotor 11 of the electric motor 1, a blade support 41 fixed to the fixed portion 39 and extending a radial direction of the rotary shaft. Each blade 37 has a first end and a second end. The first ends of the blades 37 are fixed to the blade support 41, and the second ends of the blades 37 are fixed to an annular shroud 42. Each blade 37 is shaped to suck an air from a side on which one axial end of the rotary shaft 9 is located, namely, from a side of the annular shroud 42 and to discharge the air in the radial direction of the rotary shaft 9. The fixed portion 39 has a cup shape joined to the cup-like member 31. The blade support 41 includes a truncated conical cylindrical portion 41a and an annular blade mounting portion 41b. One end of the truncated conical cylindrical portion 41a is unitarily formed with the cup-like member 31, and has a diameter which increases toward the other axial end of the rotary shaft 9. The annular blade mounting portion 41b is unitarily formed with the other end of the truncated conical cylindrical portion 41a and extends in the radial direction of the rotary shaft 9. The blades 37 are mounted on the annular blade mounting portion 41b.

The casing 5 for partially receiving the components of the electric motor 1 unitarily includes a base 45 and the bearing holder 43 by which the bearings 13 and 15 are held. The base 45 extends in the radial direction of the rotary shaft 9, and is combined with the fixed portion 39 of the impeller body 35 to define a receiving space 47 to receive the stator 7 and the rotor 1.

As shown in FIG. 2, an annular projecting portion 45b projecting toward the impeller body 35 is formed on an opposed wall portion 45a of the base 45 opposed to the impeller body 35. An annular concave portion 35b is formed in an opposed wall portion 35a of the impeller body 35. The annular projecting portion 45b is inserted into the annular concave portion 35b with a gap interposed between the annular projecting portion 45b and the annular concave portion 35b. In such a configuration, a clearance 49 is defined between the base 45 and the impeller body 35 to form a labyrinth structure. The clearance 49 which forms the labyrinth structure serves to block entry of a liquid into the receiving space 47, which receives the stator 7 and the rotor 11, from radially outside of the rotary shaft 9. In this embodiment, the clearance 49 forming the labyrinth structure includes a groove portion 49a for expanding the clearance. The groove portion 49a is formed in the opposed wall portion 35a of the impeller body 35 to communicate with the clearance 49. The groove portion 49a extends in a direction apart from the base 45. In this embodiment, the clearance 49 includes a crank portion bending to partially face the leading end of the projecting portion 45b that is formed in a portion 35c of the impeller body 35 located more radially inward of the rotary shaft 9 than the groove portion 49a. The groove portion 49a is provided within the clearance 49 to define a main part of a volume expanding portion 50 having a volume larger than other portions within the clearance 49. In other words, the opposed wall portion 45a of the base 45 and the opposed wall portion 35a of the impeller body 35 are opposed to each other in the axial direction to define the clearance 49 and are shaped to form the volume expanding portion 50.

In the electric fan in this embodiment, the volume expanding portion 50 is formed within the clearance 49 which forms the labyrinth structure. Thus, the liquid, which has entered into the clearance 49, pools within the volume expanding portion 50. As a result, entry of the liquid into the receiving space 47 may be blocked until the liquid, which has pooled within the volume expanding portion 50, goes further toward the receiving space 47. Accordingly, in this embodiment, a period of time for entry of the liquid into the receiving space may be prolonged, as compared with conventional configurations. A maximum waterproof effect may be exerted in the centrifugal fan of this embodiment especially when the electric fan is used with the casing located in an upper position and the impeller located in a lower position, which is a reverse positional relationship of FIG. 1.

Figure 3:
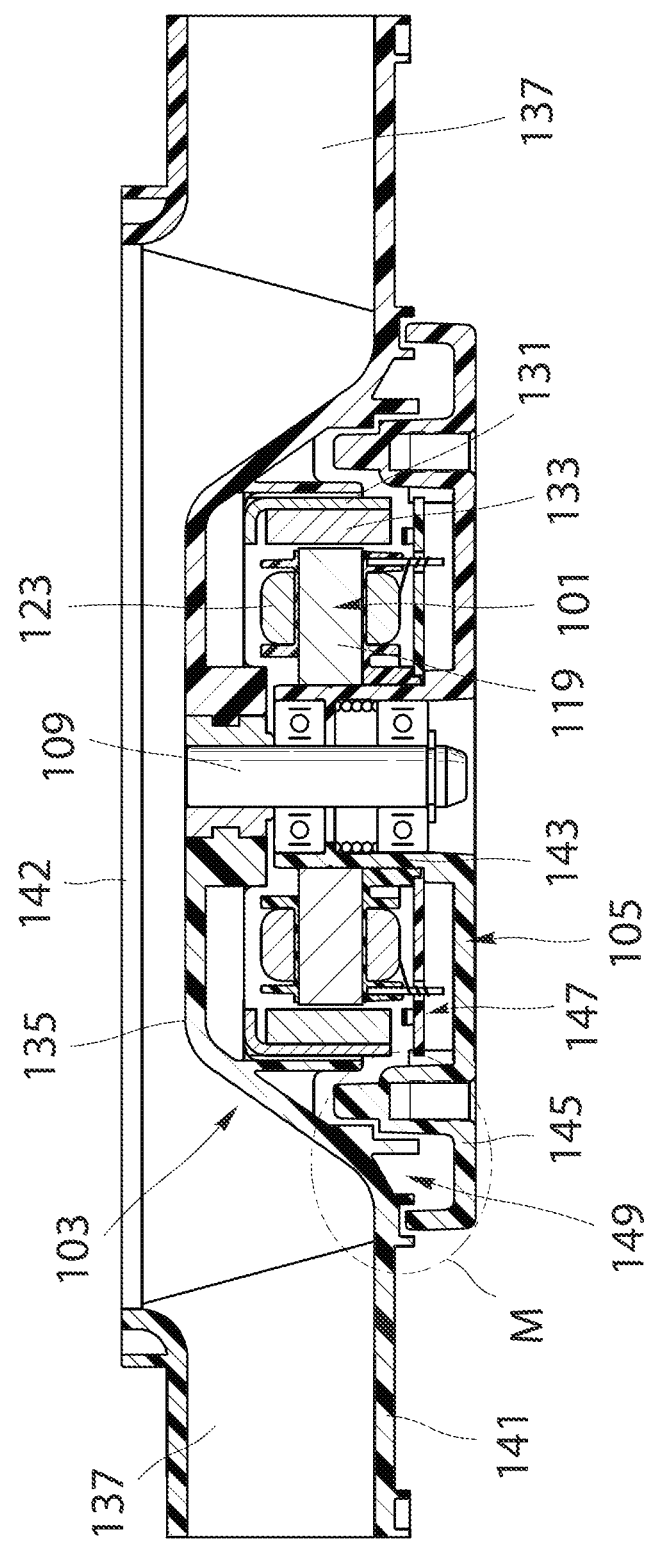
FIG. 3 is a sectional view of an electric fan in a second embodiment of the present invention applied to a centrifugal fan.
Figure 4:
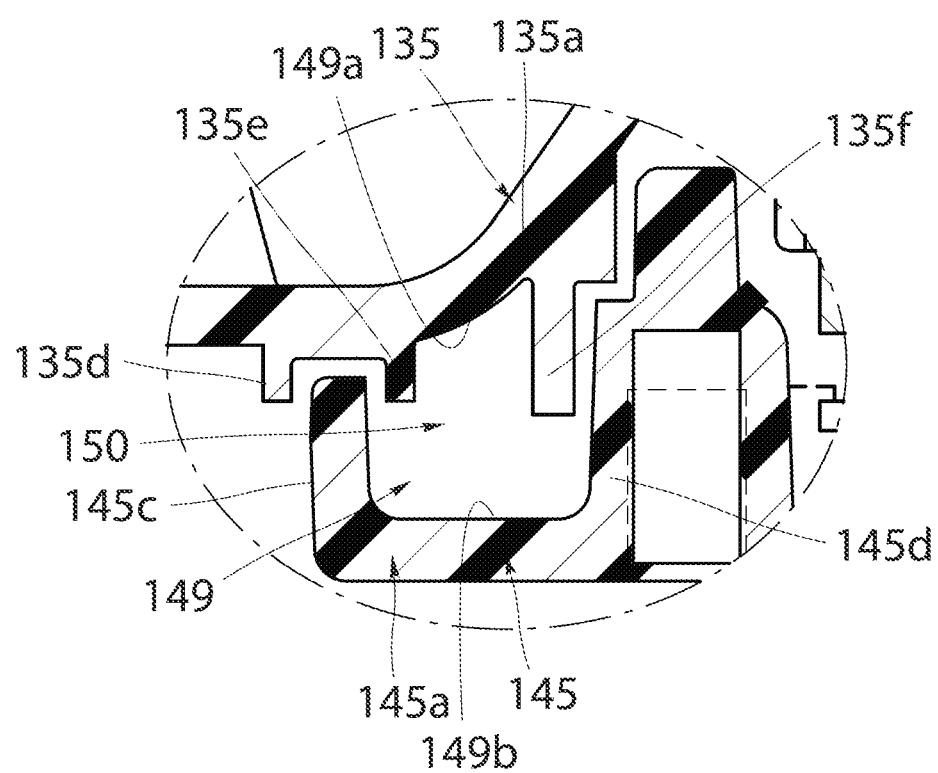
FIG. 4 is a partially enlarged view of a portion indicated by reference sign M in FIG. 3.

FIG. 3 is a sectional view of an electric fan in a second embodiment of the present invention applied to a centrifugal fan. FIG. 4 is a partially enlarged view of a portion indicated by reference sign M shown in FIG. 3. Though dimensions and shapes of respective members of the electric fan in this embodiment are different from those of the corresponding members in the electric fan shown in FIGS. 1 and 2, the electric fan of this embodiment has basically the same structure as the electric fan shown in FIGS. 1 and 2 except a cup-like member, a base of a casing, and an impeller body. Therefore, reference numerals calculated by adding 100 to the reference numerals in FIGS. 1 and 2 are assigned to members in FIGS. 3 and 4 which have basically the same structures as those in FIGS. 1 and 2. Descriptions of the members in FIGS. 3 and 4 will thereby be omitted.

As shown in FIG. 3, the electric fan in this embodiment does not include the cup-like member fixed to the rotary shaft. Rotor magnetic poles 133 formed of a plurality of permanent magnets are fixed to a cylindrical member 131 made of a magnetic conductive material.

In the electric fan of this embodiment, two annular projecting portions 145c and 145d projecting toward an impeller body 135 are formed on an opposed wall portion 145a of a base 145 opposed to the impeller body 135, as shown in FIG. 4. Further, three annular projecting portions 135d to 135f projecting toward the base 145 are formed on an opposed wall portion 135a of the impeller body 135. The projecting portion 145c of the base 145 is inserted into an annular concave portion between the projecting portions 135d and 135e of the impeller body 135 with a gap interposed between an inner surface of the concave portion and the projecting portion 145c. The projecting portions 135e and 135f of the impeller body 135 are inserted into an annular concave portion between the projecting portions 145c and 145d of the base 145 with a gap interposed between the projecting portions 135e and 135f and an inner surface of the annular concave portion. In such a configuration, a clearance 149 is defined between the base 145 and the impeller body 135 to form a labyrinth structure. A first groove portion 149a for expanding the clearance and a second groove portion 149b for expanding the clearance are included in the clearance 149. The first groove portion 149a is formed in the opposed wall portion 135a of the impeller body 135 to extend in a direction apart from the base 145. The second groove portion 149b is formed in the opposed wall portion 145a of the base 145 to extend in a direction apart from the impeller body 135. The first groove portion 149a defines a part of a volume expanding portion 150 having a volume larger than other portions within the clearance 149. The second groove portion 149b defines the remaining part of the volume expanding portion 150 having the volume larger than the other portions within the clearance 149. In other words, the opposed wall portion 145a of the base 145 and the opposed wall portion 135a of the impeller body 135 are opposed to each other in an axial direction of the rotary shaft to define the clearance 149 and are shaped to form the volume expanding portion 150 within the clearance 149.

According to the electric fan of this embodiment, even if dimensions of both of the opposed wall portion 135a of the impeller body 135 and the opposed wall portion 145a of the base 145 as measured in the axial direction are small, the volume expanding portion 150 of a certain size may be formed by the first groove portion 149a and the second groove portion 149b. Accordingly, this contributes to overall downsizing of the electric fan in the axial direction. Further, according to the electric fan of this embodiment, regardless of how to dispose the electric fan as viewed in the axial direction, specifically, regardless of which one of the impeller and the casing is disposed higher than the other of them as viewed in the axial direction, entry of a liquid into a receiving space 147 may be prevented until one of the first groove portion 149a and the second groove portion 149b is filled with the liquid.

Figure 5:
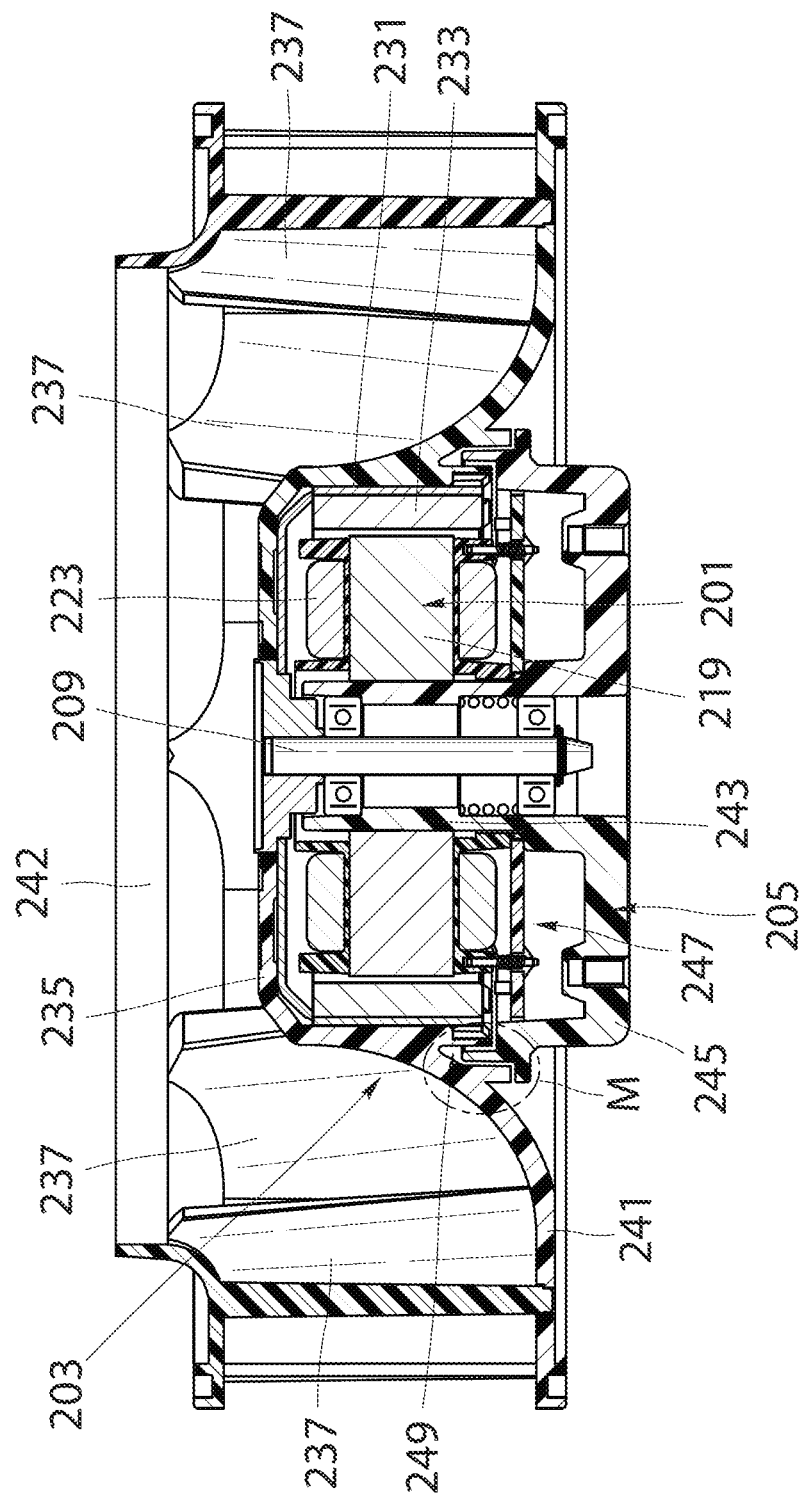
FIG. 5 is a sectional view of an electric fan in a third embodiment of the present invention applied to a centrifugal fan.
Figure 6:
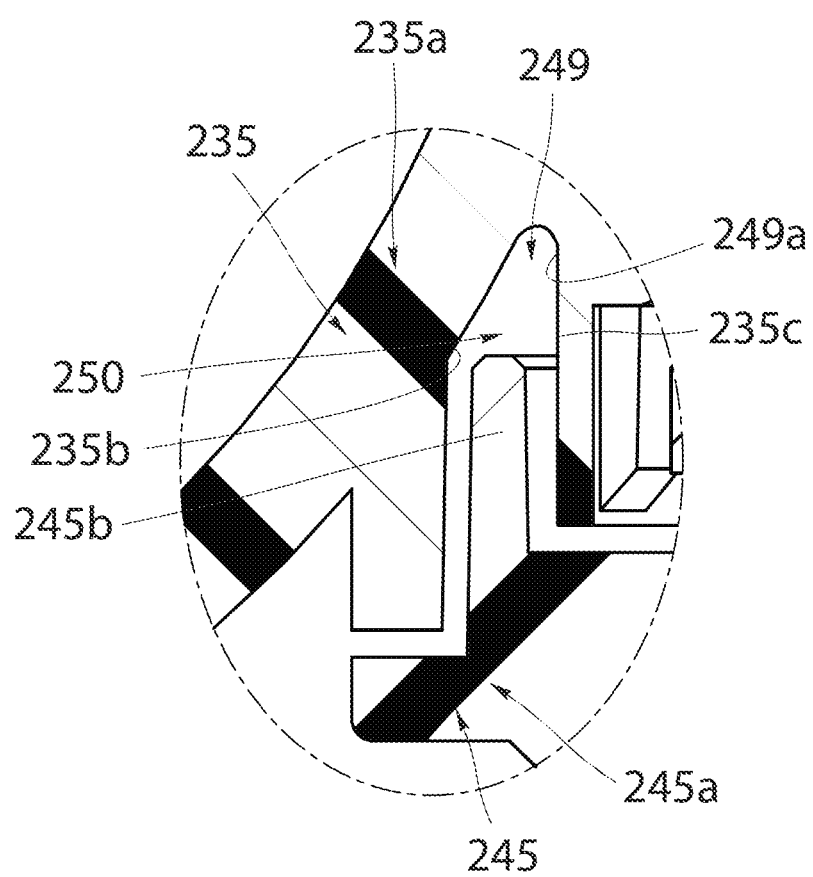
FIG. 6 is a partially enlarged view of a portion indicated by reference sign M in FIG. 5.

FIG. 5 is a sectional view of an electric fan in a third embodiment of the present invention applied to a centrifugal fan. FIG. 6 is a partially enlarged view of a portion indicated by reference sign M in FIG. 5. Though dimensions and shapes of respective members are different from those of the corresponding members in FIGS. 1 and 2, the electric fan of this embodiment has basically the same structure as the electric fan shown in FIGS. 1 and 2 except the configuration of a groove portion for expanding a clearance. Therefore, reference numerals calculated by adding 200 to the reference numerals in FIGS. 1 and 2 are assigned to members in FIGS. 5 and 6 which have basically the same structures as those in FIGS. 1 and 2. Descriptions of the members in FIGS. 5 and 6 will thereby be omitted.

In the electric fan of the first embodiment shown in FIGS. 1 and 2, the wall portion 35c of the impeller body 35 located radially inside of the annular groove portion 49a constituting the volume expanding portion 50 partially faces the projecting portion 45b. In the electric fan of this embodiment, a wall portion 235c of an impeller body 235 located radially inside of a groove portion 249a for expanding a clearance does not face the leading end of a projecting portion 245b. Thus, the dimension of an opening portion of the groove portion 249a in a radial direction of a rotary shaft 209 is larger than that in the electric fan of the first embodiment. However, the groove portion 249a has a smaller length or depth in an axial direction than in the electric fan in the first embodiment. As a result, a cross-sectional shape of the groove portion 249a which constitutes a main part of a volume expanding portion 250 is substantially a triangle, as clearly known from FIG. 6. A maximum waterproof effect may be exerted in the electric fan of this embodiment when the electric fan is used with the casing located in an upper position and the impeller located in a lower position, which is a reverse positional relationship of FIG. 5 as in the electric fan of the embodiment shown in FIG. 1.

Figure 7:
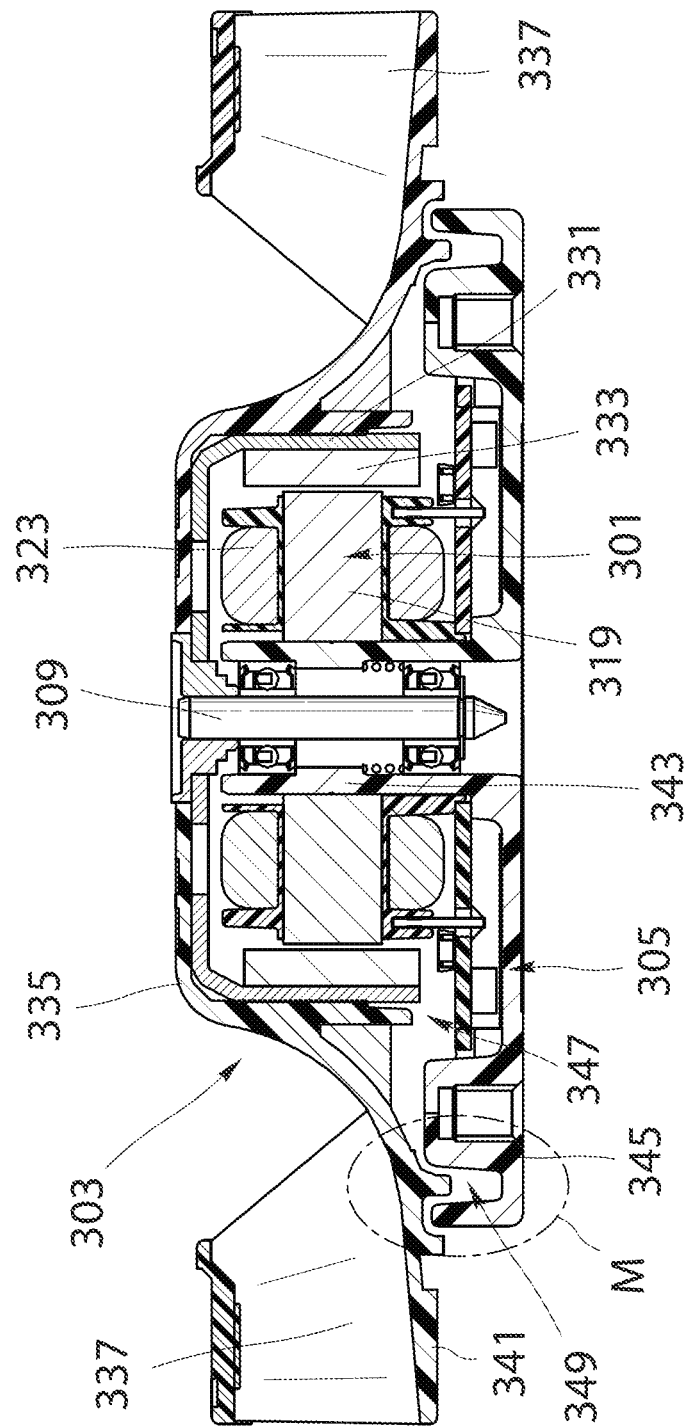
FIG. 7 is a sectional view of an electric fan in a fourth embodiment of the present invention applied to a centrifugal fan.
Figure 8:
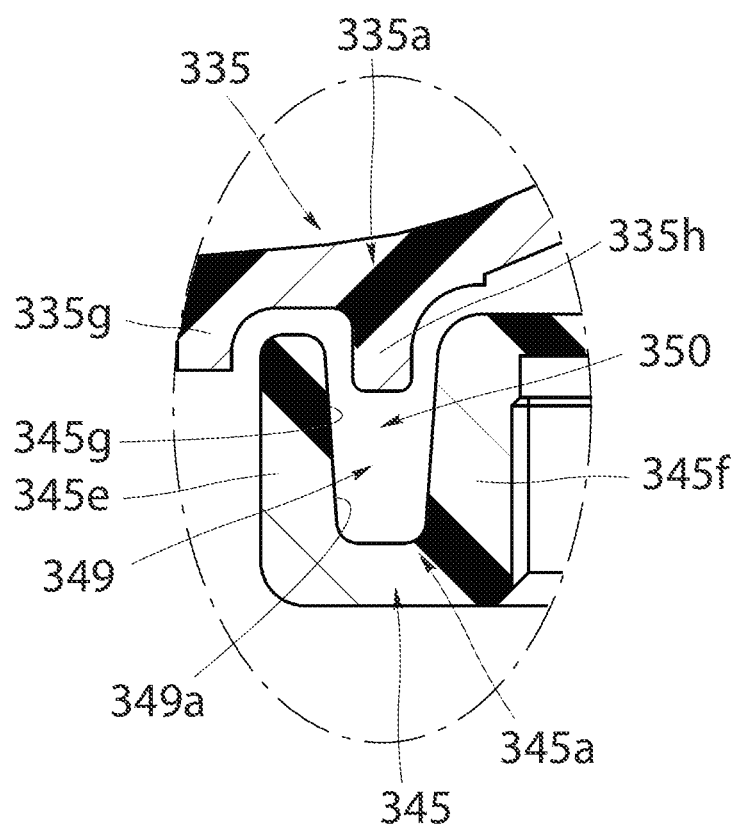
FIG. 8 is a partially enlarged view of a portion indicated by reference sign M in FIG. 7.

FIG. 7 is a sectional view of an electric fan in a fourth embodiment of the present invention applied to a centrifugal fan. FIG. 8 is a partially enlarged view of a portion indicated by reference sign M in FIG. 7. Though dimensions and shapes of respective members are different from those of the corresponding members in FIGS. 1 and 2, the electric fan of this embodiment has basically the same structure as the electric fan shown in FIGS. 1 and 2 except a base of a casing and an impeller body. Therefore, reference numerals calculated by adding 300 to the reference numerals in FIGS. 1 and 2 are assigned to members in FIGS. 7 and 8 which have basically the same structures as those in FIGS. 1 and 2. Descriptions of the members in FIGS. 7 and 8 will thereby be omitted.

As shown in FIG. 8, two annular projecting portions 345e and 345f projecting toward an impeller body 335 are formed on an opposed wall portion 345a of a base 345 of the electric fan, the opposed wall portion 345a being opposed to the impeller body 335. Two annular projecting portions 335g and 335h projecting toward the base 345 are formed on an opposed wall portion 335a of the impeller body 335. The projecting portion 345e of the base 345 is inserted into a concave portion formed between the projecting portions 335g and 335h of the impeller body 335 with a gap interposed between an inner surface of the concave portion and the projecting portion 345e. The annular projecting portion 335h provided on the impeller body 335 is inserted into a concave portion 345g formed between the annular projecting portions 345e and 345f provided on the base 345, with a gap interposed between an inner surface of the concave portion 345g and the annular projecting portion 335h. In such a configuration, a clearance 349 is defined between the base 345 and the impeller body 335 to form a labyrinth structure. A groove portion 349a for expanding the clearance is included in the clearance 349. The groove portion 349a is formed in the opposed wall portion 345a of the base 345 to extend in a direction apart from the impeller body 335. The groove portion 349a defines a main part of a volume expanding portion 350 having a volume larger than other portions within the clearance 349. In other words, the opposed wall portion 345a of the base 345 and the opposed wall portion 335a of the impeller body 335 are opposed to each other in an axial direction to define the clearance 349 and are shaped to form the volume expanding portion 350. A maximum waterproof effect may be exerted in the centrifugal fan of this embodiment when the electric fan is used with the base 345 located in a lower position and the impeller body 335 located in an upper position as shown on the page of FIG. 7.

Each of the above-mentioned embodiments shows an application example of the present invention suited to the centrifugal fan. The present invention may also be applied to other types of electric fans such as an axial fan and an oblique flow fan.

According to the present invention, the volume expanding port on is formed within the clearance which forms the labyrinth structure. Thus, the liquid that has entered into the clearance pools in the volume expanding portion. A period of time until the liquid enters into the receiving space may be prolonged, as compared with conventional structures, thereby enhancing waterproof performance. Further, the volume of the entire labyrinth structure may be increased mo re than in conventional structures by forming the volume expanding portion, thereby enhancing the waterproof performance as well. Accordingly, dimensional tolerances of the casing and the impeller do not need to be reduced so much as in the conventional structures. Even if assembly accuracy of the electric fan is lower as compared with the conventional structures, the waterproof performance may not be significantly reduced.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:
1. An electric fan comprising:
   an electric motor including:
      a rotary shaft;
      a stator including stator magnetic poles; and
      a rotor including rotor magnetic poles and configured to rotate outside the stator, centering on the rotary shaft;
   an impeller disposed outside the rotor, the impeller including:
      an impeller body fixed to the rotor and including an opposed wall portion; and
      a plurality of blades fixed to the impeller body;
   one or more bearings for supporting the rotary shaft; and
   a casing including;
      a bearing holder by which the one or more bearings are held; and
      a base including an opposed wall portion opposed to the opposed wall portion of the impeller body in an axial direction of the rotary shaft and extending in a radial direction of the rotary shaft and combined with the impeller body to define a receiving space to receive the stator and the rotor, wherein
   a clearance is defined between the opposed wall portion of the base and the opposed wall portion of the impeller body to form a labyrinth structure for blocking entry of a liquid into the receiving space from radially outside of the rotary shaft;
   the opposed wall portion of the base and the opposed wall portion of the impeller body are shaped to form a volume expanding portion having a volume larger than other portions within the clearance;
   a first groove portion for expanding the clearance is formed in the opposed wall portion of the impeller body, the first groove portion extending in a direction apart from the base to define a part of the volume expanding portion; and
   a second groove portion for expanding the clearance is formed in the opposed wall portion of the base, the second groove portion extending in a direction apart from the impeller body to define a remaining part of the volume expanding portion;
      wherein walls defining the first groove portion are within a periphery of walls forming the second groove portion.

* * * * *